United States Patent
Ylitalo

(10) Patent No.: US 8,565,193 B2
(45) Date of Patent: Oct. 22, 2013

(54) BEAM FORMING METHOD, APPARATUS AND SYSTEM

(75) Inventor: Juha Ylitalo, Oulu (FI)

(73) Assignee: Elektrobit Wireless Communications Oy, Oulu (FI)

( * ) Notice: Subject to any disclaimer, the term of this patent is extended or adjusted under 35 U.S.C. 154(b) by 175 days.

(21) Appl. No.: 13/123,929

(22) PCT Filed: Oct. 16, 2008

(86) PCT No.: PCT/FI2008/050579
§ 371 (c)(1),
(2), (4) Date: Apr. 13, 2011

(87) PCT Pub. No.: WO2010/043752
PCT Pub. Date: Apr. 22, 2010

(65) Prior Publication Data
US 2011/0255434 A1 Oct. 20, 2011

(51) Int. Cl.
*H04W 4/00* (2009.01)
(52) U.S. Cl.
USPC .......................................... 370/334; 370/252
(58) Field of Classification Search
USPC ........................................ 370/334, 252, 253
See application file for complete search history.

(56) References Cited

U.S. PATENT DOCUMENTS

| | | | | |
|---|---|---|---|---|
| 6,453,177 | B1 * | 9/2002 | Wong et al. | 455/562.1 |
| 7,072,692 | B1 * | 7/2006 | Katz et al. | 455/562.1 |
| 2006/0072604 | A1 * | 4/2006 | Sutivong et al. | 370/437 |
| 2006/0153227 | A1 * | 7/2006 | Hwang et al. | 370/465 |
| 2008/0095251 | A1 * | 4/2008 | Yeh et al. | 375/260 |
| 2009/0117914 | A1 * | 5/2009 | Kwon et al. | 455/454 |
| 2010/0103900 | A1 * | 4/2010 | Yeh et al. | 370/330 |
| 2011/0128916 | A1 * | 6/2011 | Kwon et al. | 370/328 |

FOREIGN PATENT DOCUMENTS

| | | |
|---|---|---|
| WO | WO0156192 A1 | 8/2001 |
| WO | WO0178254 A1 | 10/2001 |
| WO | WO2006068413 A1 | 6/2006 |

OTHER PUBLICATIONS

Zetterberg, P. et al., "The Spectrum Efficiency of a Base Station Antenna Array System for Spatially Selective Transmission", IEEE Trans. on Vehicular Technology, vol. 44, No. 3, pp. 651-660 (1995).
Timo Laakso, International Search Report for corresponding International Application No. PCT/FI2008/050579, pp. 1-3, (Jun. 24, 2009).

* cited by examiner

*Primary Examiner* — Gary Mui
(74) *Attorney, Agent, or Firm* — Hoffmann & Baron, LLP

(57) ABSTRACT

The invention relates to a method of transmitting data in a communications system. The invention comprises: receiving from a user an uplink signal using multiple narrow antenna beams; measuring beam-specific pilot signal powers from the uplink signal for all the beams; and using the measured pilot signal powers to determine which one or ones of the downlink beams is to be used for a downlink signal for the user.

16 Claims, 4 Drawing Sheets

BEAM FORMING METHOD, APPARATUS AND SYSTEM

CROSS-REFERENCE TO RELATED APPLICATION

This application is a National Phase application of International Application No. PCT/FI2008/050579, filed Oct. 16, 2008, which is incorporated herein by reference in its entirety.

BACKGROUND

1. Field

The present invention relates to communications technology, and more particularly to a beam forming method, apparatus and system in wireless communications technology.

2. Description of the Related Art

In communications technology, at high carrier frequencies, the path loss is significantly larger than with small carrier frequencies. Thus, e.g. at a frequency of 2.5 GHz, like for a wireless metropolitan area network technology WiMAX (Worldwide Interoperability for Microwave Access), the path loss is significantly larger than when operating with e.g. GSM/EDGE (Global System for Mobile Communications/Enhanced Data Rates for Global Evolution) system or UMTS (Universal Mobile Telecommunications System) system at 900 MHz. This leads to the fact that it is difficult to obtain large cell ranges and adequate coverage with port-based network access standard 802.16 or standard 802.16e communications without large radio transmitter TX powers and large high-gain antennas.

Some solutions have been proposed to 2G wireless communication systems, which try to apply beamforming techniques to solve the problem, i.e. how a standard 2-antenna base station could take advantage of a multi-antenna array. However, the problem with such 2G systems is that the composite downlink signal cannot be decomposed to user-specific data and control signals at the external beamforming unit. Moreover, the problem of transmitting a reference signal (i.e. a pilot/training signal) to the entire sector coverage jointly with beamforming cannot be solved by these systems.

A state-of-the-art remote radio head (RRH) unit can be described to be a part of a distributed base station system in which all radio-related functions are contained in a unit mounted outside a traditional base station transceiver system BTS but linked to a main transceiver unit that contains the control and baseband signal processing functions.

Most cellular systems apply sectorized base stations, which have up to 40 W (watt) of TX power per sector and which utilize large, up to 24 dBi (decibel isotropic) sector-antennas. However, the most advanced commercial 2G/3G base stations employ fixed beam approach or other antenna signal combining methods, which require beam- or antenna-specific signal processing in base band. Thus e.g. a 8-beam antenna array requires 8 cables and 8 radio frequency RF chains between the antenna unit, i.e. the RRH unit and the base station, i.e. the main transceiver unit. However, all these proposed solutions fail to disclose, how to design a simple base station and a mobile terminal with limited signal processing requirements, which is power-efficient but still has good coverage and link budget.

SUMMARY

An object of the present invention is thus to provide a method, an apparatus and a system for implementing the method so as to solve the above problems. The objects of the invention are achieved by a method and an arrangement, which are characterized by what is stated in the independent claims. The preferred embodiments of the invention are disclosed in the dependent claims.

The invention is based on the idea of estimating, by a remote radio head element, the best downlink beams for each user from uplink signals or tiles.

An advantage of the method and arrangement of the invention is that a large communication coverage can be achieved also when using high frequency communication.

BRIEF DESCRIPTION OF THE DRAWINGS

In the following the invention will be described in greater detail by means of preferred embodiments with reference to the accompanying drawings, in which.

DETAILED DESCRIPTION

Figure 1:
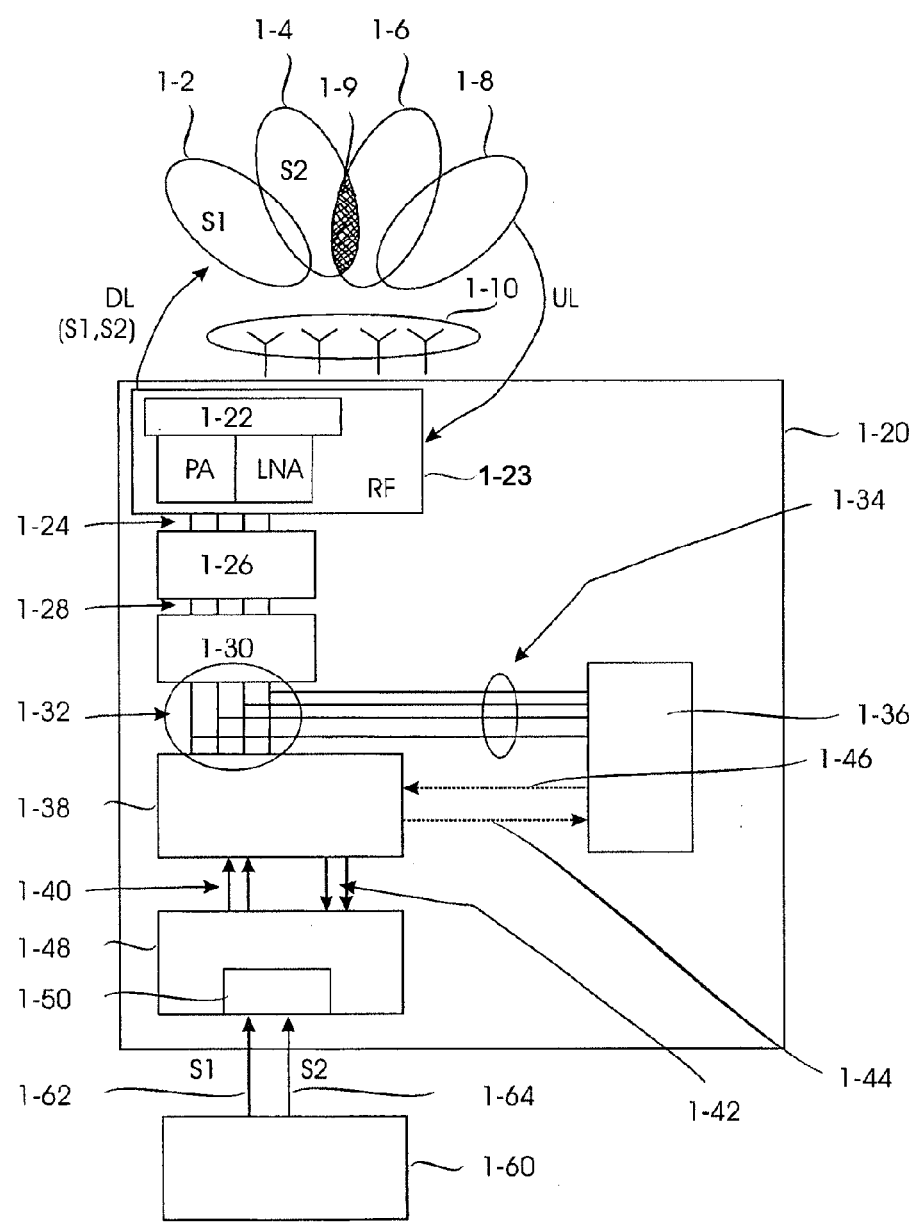
FIG. 1 is a block diagram of the invention and its embodiments.

The invention can be applied to different communications technologies and systems like wireless communications systems. These comprise WiMAX (Worldwide Interoperability for Microwave Access), a wireless metropolitan area network system, 3GPP/LTE (3rd Generation Partnership Project/Long Term Evolution) systems, IMT-Advanced (International Mobile Telecommunications) systems or OFDMA (Orthogonal Frequency-Division Multiple Access) based radio access systems. The invention can also be applied to 2G (Generation), 2.5G, 3G and 4G systems, packet transfer mode and switched circuit mode communications systems.

The communications systems according to the standards 802.1x, like WiMAX 802.16e, offer various techniques for MIMO (multiple-input and multiple-output) and beam forming. MIMO uses multiple antennas at both a trans-mitting side and a receiving side to improve communication performance. Beam forming can be described to be a signal processing technique, which can be used e.g. in antenna arrays for directional signal transmission or reception, in which spatial selectivity is achieved by using adaptive or fixed receive/transmit beam pattern. Although in the following WiMAX systems is disclosed, the invention is not limited to these systems. E.g. 3GPP LTE applies similar OFDMA techniques in the downlink.

The invention and its embodiments can be applied to sense, measure or scan in azimuth domain, in elevation domain or in both domains the best directions for directing transmitting TX power for different users. Different power management methods can then be used for different beams of different users.

The beamforming can be fixed beam forming or adaptive beam forming or their combination. In the fixed beam forming a phase circuitry like a butler matrix is used, whose different inputs correspond to different beams of different directions. In the uplink the pilot signal strength of the wanted user equipment is measured in all beams based on e.g. a power. In the downlink the communication is sent to the beast beam, which has the most uplink power. In this the transmitting power can be focused to a narrower sector (i.e. beam) than the whole sector, and a beam forming gain is obtained. The control of transmitting power can be done as known from the state of the art.

In the uplink side, pilot signals from all or selected beams can be measured to be able to choose the best beam(s). In the downlink side, the transmitting power intended to each user equipment can be allocated to one or two or more beams.

The measurement of best beams can be based on the measurement of the received power of the pilot signal.

It is also possible to change the shapes of at least one beam e.g. in digital implementations. In analog implementations (like in Butler matrix implementation) the best beam can be chosen.

Additionally, the invention is related to RNS (radio network subsystem) WiMAX base transceiver station BS and a module of the same. The invention makes it also possible to connect any standard 2-antenna BS to the proposed multi-antenna remote radio head, which has more than two antennas.

FIG. 1 is a block diagram of the invention and its embodiments. It shows one example of a transmitter, like a WiMAX transmitter using a 4-beam 1-2, 1-4, 1-6, 1-8 remote radio head 1-20 RRH as an example.

In downlink, a basic beamforming method can be used, in which method only one (the best) beam is chosen for each user for transmission. This means one signal for one beam and for one user. It is also possible to use transmission diversity, in which case the transmission is send to one user by two or more beams. The transmission signals can be coded e.g. space-time coded or can be sent by different time delays or intervals, in which case the transmission is also send to one user by two or more beams. Also in MIMO the transmission is sent by two or more beams to the same user. It is to be noted that different signals can be send for different users from the same beam. The idea is to design a remote radio head, which maps one to two TX signals 1-62 (S1), 1-64 (S2) of a basic base station 1-60 BS to e.g. 1 to 2 best beams out of e.g. four beams of the RRH. The best beams can be those beams having the largest uplink power for the wanted user equipment. As described above, in basic TX mode from the base station to the user equipment only one signal is transmitted to each mobile terminal. Two TX signals can be applied in case of transmit diversity, such as an STC (Space-Time Coding in WiMAX) system, or in case of MIMO (Multiple Input, Multiple Output) system such as SM (Spatial Multiplexing) system in WiMAX. The basic TX signal formation, such as a sub-channel allocation, can be performed at a baseband unit 1-60.

The role of RRH is to estimate the best downlink DL beams for each user from the uplink UL signals or tiles, which DL signals can then be sent continuously and/or frame-by-frame or periodically or e.g. in response to a sounding request by the base transceiver station BTS or to a triggering event. The uplink signal used for power measurement can be e.g. a pilot signal or a data signal. A downlink can be described to be a physical link from the transmitting BTS towards the receiving user equipment UE or a mobile station MS. The downlink is often referred also as a forward link. The other way, from the user equipment to the base transceiver station, can be described as an uplink or a reverse link.

The estimation can also be done by means of a periodic uplink ranging in a Burst-Beam Control signal block, which maintains a mapping table describing the best beams for each user, user burst or subchannels on e.g. a frame-by-frame basis. In one embodiment, the best beams are evaluated simply by estimating the power of uplink UL pilot subcarriers in different beams corresponding to each UL user burst or sub-channels.

Four beams of RRH can be e.g. in co-usage of 50 mobile terminal users. Many users or user equipment can be allocated to the same beam. The uplink pilot power of each user can be measured in each beam and the user can then be switched e.g. from the beam 1 to the beam 4 depending on the user direction and radio channel conditions. The user equipment may or may not know that one base station has many beams, and thus a standard user terminal without any specific beamforming features can be applied in the embodiment. It is the base station or the remote radio head unit that makes the uplink signal measurements and allocates the user equipment according to these measurements. It is possible for example that the user can use beams 3 and 4 and then starts to use beams 2 and 3. The user specific UL burst (tile) structure can tell, where the user specific pilot subcarriers reside in the uplink frame, and this info can be obtained from the UL MAP info in the beginning of the DL frame. The beam mapping block maps the different users based on their UL burst powers to the best 1 to 2 beams. One or multiple users can use the same beam or more generally, one or multiple beams can be shared by one or multiple users. With e.g. a 4-beam RRH this beam mapping operation requires that the original 1 to 2 parallel frames of different users are reorganised e.g. to 4 parallel, frames/bursts corresponding to the four beams (see FIG. 5). For example, if TX diversity is applied, the two parallel bursts of each user are allocated to two best beams of that user in RRH and thus these bursts appear in only 2 out of 4 frames. In Wimax systems the term "frame" is used for the whole DL/UL frame, but it comprises separately the DL sub-frame and the UL sub-frame.

The broadcasting info is transmitted in all 4 parallel frames via all beams.

FIG. 1 describes also a principle of the proposed beam forming method in case of 2×2 MIMO, wherein 2×2 refers to two TX and two RX antennas. In case of a basic 1-antenna transmission, each user burst is allocated only to the best beam. However, in case of transmitting broadcast information or any other information to the entire sector this information shall be allocated to the all beams. In that case it is beneficial to apply cyclic delay diversity CDD for different beams. The cyclic delay diversity uses diversity scheme used in the OFDM-based communication systems and transforms the delay diversity into the frequency diversity while avoiding inter-symbol interference. In case of STC (Matrix A) and 2×2 MIMO (Matrix B, Matrix C), the different user bursts in the two parallel TX frames are allocated to the 2 best beams (See FIG. 5). The details of the WiMAX STC and MIMO schemes are known to a person skilled in art and are not described here in detail. The preamble and DL/UL MAP (Downlink/Uplink Medium Access Protocol) information are transmitted from each of the 4 beams by applying the cyclic delay diversity, which can be applied after the IFFT (Inverse Fast Fourier Transform) before the insertion of the cyclic prefix. It is noted that the cyclic delay diversity can be applied, because it does not require any changes to the terminal operation. More particularly, the terminal does need to know, whether the cyclic delay diversity is on or not. The CDD concept known to a person skilled in art is not described here in detail.

In FIG. 1 the base station with a baseband unit and components 1-60 can comprise a transceiver with two or more antenna ports 1-62, 1-64. They can communicate signals S1, S2 with the remote radio head RHH 1-20, i.e. receive data and/or information from the remote radio head or transmit data and/or information to the remote radio head. The signaling can be transmitted and received by a beam mapping element 1-38 in RHH, which element can also be in communication with a burst processing element 1-38 or which two elements can together form a single element 1-38. The communication can be signaled via one or more interfaces 1-50 in an interface element 1-48. There can exist one or more signaling paths for the communication to 1-40 the beam mapping/burst processing unit and one or more signaling paths for the communication from 1-42 the beam mapping/burst processing unit. Towards user equipments UE the beam mapping unit is in communication with a phase shift network 1-22. Its function is to generate narrow beams and it can be passive or active. Active network can comprise active components like operational amplifiers and passive network comprises only passive components like resistors or capacitors. The phase shift network can comprise many elements, e.g. one or more power amplifiers PA and one or more low noise amplifiers LNA. The phase shift network can be part of a radio frequency RF element 1-23, which can reside apart from the baseband base station. It is also possible to have some of the base band components in RHH and some of the RF components in the base station.

Between the phase shift network and the beam mapping element there can be converters 1-26 like digital-to-analog converters DAC towards to the user equipment and analog-to-digital converters ADC towards to the base station, and said converters can communicate 1-24 with said phase shift network element. These converters can be in communication 1-28 with an element 1-30 comprising e.g. the IFFT element or function, a CP (Cyclic Prefix) element or function and different filtering elements or functions.

The antenna array 1-10 can comprise two or more antennas, e.g. four, eight or twelve antennas. Typically the same antennas operate both in UL and DL. However, some or all of the antennas can be configured for receiving purposes and some or all of the antennas can be configured for transmitting purposes. The antenna array or part of it can be linear or non-linear with different beam forming BF gain. Said beam forming gain can be e.g. four in case of four antennas and in one embodiment it can be adaptively controlled e.g. by selecting the number of antennas which form the beams. The array can provide four beams 1-2, 1-4, 1-6 and 1-8, and some or all of the beams can be overlayed 1-9 with another beam or with all of the beams or the beams can be totally independent with each other. The antennas can be conventional base station antennas, or specific antenna elements, which are designed to operate as an antenna array entity.

The remote radio head element 1-20 can also comprise a burst beam control element 1-36, in which user specific power measurements for each beam are done. The measuring can be at least partly based on UL-MAP information. The user and/or beam information is signaled 1-46 from the burst/beam control element to the burst processing/beam mapping element and the uplink burst information of the user can be signaled 1-44 from the burst processing/beam mapping element to the burst/beam control element. There exists also information link 1-34 from the phase shift network or from the dement 1-30 to the burst/beam control element 1-36 for estimating the best beams for each user. It must be noted that the number of beams can be independent of the number of antennas or the number of antenna ports of the baseband. In one embodiment, the number of the antennas and/or beams of the RHH element 1-20 is greater than the number of antenna ports or connectors (of signals 1-62 and 1-64) of the base station 1-60. In another embodiment, said numbers can be the same. In still another embodiment the number of the antennas and/or beams of the RHH element is smaller than the number of antenna ports. Alternatively, the number of beams can be a function of the number of antennas and/or the port of the baseband. One or more computers or computer programs can implement or control said elements and functions.

All the disclosed elements of the remote radio head and the base station can be implemented as software components, as hardware components or as a mixture of software and hardware components. Although some elements are described to be in the remote radio head element, they can also be in another element or as stand-alone elements but being in communication with suitable elements in the remote radio head element. All the elements of RHH can be embedded and/or integrated into one or more ICs (Integrated circuits). Also conventional components can be used.

In the method of the invention the remote radio head monitors all bursts by listening one or more user specific uplink pilot signals and maps one or two best beams to each downlink burst. The RRH element then allocates different downlink bursts to different beams while the preamble and MAP information are transmitted via all beams using cyclic delay diversity.

In the invention and its embodiments control information about uplink user allocation can be retrieved, or the uplink allocation of a user equipment can be retrieved from a downlink control signal. This is, these are for obtaining information on user(s) and their carrier frequencies. N carrier frequencies are divided for different users, and it must be known what are the frequencies for each user and/or for what subcarrier frequencies are determined for each user or used by the user. The control information can tell with which frequencies and at which symbol intervals the terminal can send uplink data. This control signal can tell e.g. at what point or range of the frequency spectrum the user specific pilot subcarriers reside. This information can be obtained from the UL MAP control signal information, which is sent in WiMAX systems in the beginning of the downlink sub-frame or from other control signal information. The retrieval thus shows from what carrier frequencies pilot measurements can be done for each user. Different users are allocated to different carrier frequencies all the time or during a certain period. This can be done e.g. on a frame-by-frame basis.

An uplink signal 2-4, 2-70 can be received using multiple narrow antenna beams. Each of the beams receive signals from different narrow sectors e.g. within a 120-degree sector of a three-sector base station. The narrow sectors (beams) can be separated by each other or they can be at least partly on top of each other. Also only one antenna can be used if said antenna can divide the original sector into narrow or narrower subsectors. In one embodiment at least two antennas with the same polarity are used, and the beam forming unit divides the original sector into two parts. In FIG. 1 four narrow beams with the same polarity are used. The element 1-20 can be in the antenna or on the mast. The element 1-22 is the phase shift network, which can shift the phases of the antenna signals in a way that gives narrow beams in different directions. E.g. if the BS sector is about 120 degrees wide, it can be divided into four different narrow beams of about 30 degrees wide.

The beam-specific pilot signal powers can be measured for each user or user equipment due to the fact that the pilot subcarriers of different users are now known from the UL-MAP control information and from the uplink user allocation. It is thus known which subcarrier frequencies the user or user equipment uses, i.e. which pilot signal is measured. The measurement is done for all beams, e.g. for all four beams. In other words, the power of the user or the signal power of the user communication or data communication or the pilot power of the user is measured from all the beams. Thus the signal power from the user uplink signal, from the user equipment to the base station, of the desired user can be measured and the pilot signals are known, but also the locations of data symbols are known. After that by using the measured pilot signal powers it can be determined which one or ones of the downlink beams or downlink narrow beams is to be used for a downlink signal.

In the invention and its embodiments the baseband signal or the uplink or uplink signal can be transceived via a first set of ports and the RF signal or the uplink or uplink signal can be transmitted via a second set of ports containing more ports than the first set of ports. In other words, e.g. only two signal paths are needed from the base station, but there exists e.g. four antenna/beam signal paths in the remote radio head.

The beamforming function can be realized as an analogue beam-forming unit in the remote radio unit. The downlink beam selection functionality can be realized in the remote radio unit. This can be proceeded by choosing one or two beams out of e.g. four possible beams to which the transmission signal is fed, and the sector is divided into narrow beams and the same signal is fed to two best or two better beams. By doing this the transmission can be focused to the wanted direction, to the direction that can best reach the user.

The preamble pilot signal and DL/UL control information shall be reached at all times in the whole sector. Thus it can also be defined to be a control signal for the whole sector. The user equipment can hear the pilot signal and synchronize itself to the network. With the MAP signal, control information can be transmitted to the user equipment on which subcarrier signals they can use. Thus by measuring the pilot signal power from the uplink transmission in response to uplink MAP information transmitted in the downlink transmission, the information on, where the uplink signal is, can be obtained.

Figure 2:
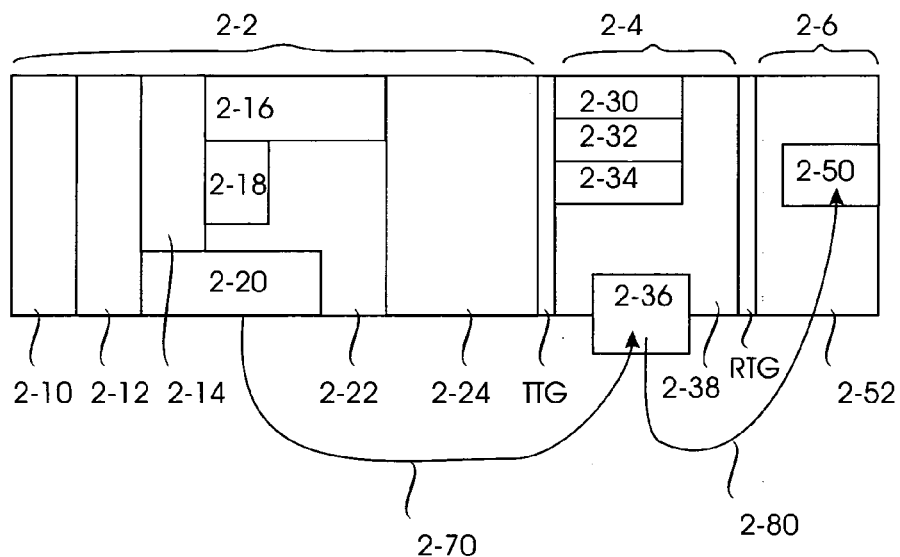
FIG. 2 shows a frame structure of the invention and its embodiments.

FIG. 2 describes functional blocks of the invention and its embodiments. It shows one possible frame structure or structures that can be used e.g. in WiMAX communication. The frame structure can be described as a PUSC (Partial Usage of SubChannels) frame. It is possible to measure user or burst specific pilot signal power in uplink for different beams. This can be based on UL-MAP information. Best beam(s) is/are applied for in the next downlink DL subframe for each user.

FIG. 2 shows one example of the whole PUSC frame structure. In this example the structure can comprise a first DL subframe 2-2, an uplink UL subframe 2-4 and a second DL subframe 2-6. The first DL subframe can comprise a preamble portion 2-10, a DL MAP portion 2-12 and a UL MAP portion 2-14. It can also comprise a first DL burst portion 2-16, a second DL burst portion 2-18 and a third DL burst portion 2-20, and other data 2-22. The first DL subframe can end with a Space-Time Coding STC zone for MIMO 2-24 (multiple-input and multiple-output) applications.

The UL subframe 2-4 can comprise a ranging portion 2-30, a UL burst portion 2-32 and a fourth DL burst portion DL Burst 2 2-34, and other data 2-38. After the UL subframe 2-4, next DL subframe is transmitted 2-52.

The UL-MAP information 2-14 of the downlink subframe 2-2 is signaled to the UL best beam measurement block 1-36 for enabling the best beam measurement for each user. After the best beams for each user have been measured in the element 1-36 (see FIG. 1), these beams are applied in the next downlink subframe 2-6 for those users 2-50. In more particularly, RHH transmits one or more DL sub frames to one or more user equipment and receives UL subframe(s) from one or more user equipment. In response to receiving the information of the UL subframe(s) and especially the UL MAP information from the DL subframe(s), best beam measurement(s) can be proceeded in RHH or in some element outside of RHH working in connection with RHH or the base station. In the next DL subframe(s) best or optimised beam(s) for each user can be used.

Between the first DL subframe and the UL subframe there can be a differentiating period TTG (Transmit/Receive Transition Gap), and between the UL subframe and the second DL subframe there can be another differentiating period RTG (Receive/Transmit Transition Gap). These periods can be of different lengths or of essentially the same length. The lengths of these periods can be e.g. in the range of about 5 to 200 microseconds.

The invention and its embodiments can be applied directly to analog beam forming by influencing e.g. the transmitting power of RHH in response to the method steps of the invention. This leads to simple and robust structures and algorithms. As described above, the user specific power measurements are performed simply by estimating the pilot power corresponding to the UL subchannels of the user. Since UL tile can comprise e.g. 3×4 symbol-subcarrier constellations, which has 4 pilot subcarriers, it is possible to carry out the user specific pilot power measurement with rather tight pilot grid. This improves the reliability of the pilot power estimation. The pilot powers for each allocated user are measured for each beam. The 1 to 2 beams with largest UL pilot power are selected for the DL transmission for each user. Also other selection criteria can be used. The principle can be applied also to digital beam forming, which requires calibration in RRH and rather complex algorithms, which can require a lot of digital signal processing DSP power. The third possibility is to apply the principle in algorithms with mixed analog and digital structures and beam forming.

Figure 3:
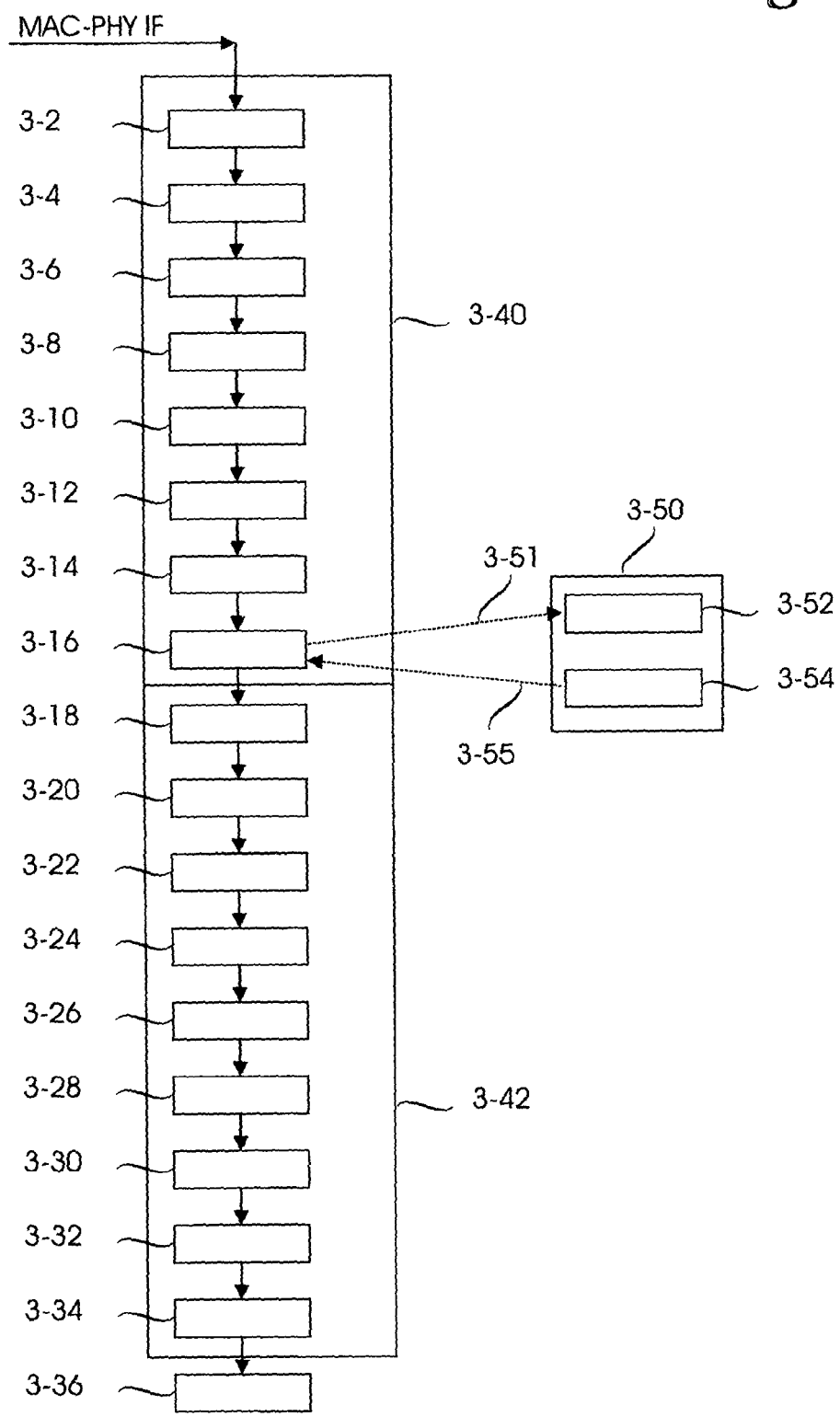
FIG. 3 describes functional blocks of the invention and its embodiments.

FIG. 3 describes functional blocks of the invention and its embodiments. It also illustrates, as an example, how the proposed method is applied with respect to the functional blocks of a WiMAX base station. All the disclosed elements of the loop for each burst 3-40 and of the loop for one antenna 3-42 can be implemented as software components, as hardware components or as a mixture of software and hardware components. Although the elements are described to be in said loops, they can also be in another element, in another loop or as stand-alone elements but being in communication with suitable elements in said loops. Some of the elements of the loops are optional, like the reduction function 3-28. The blocks from 3-2 to 3-22 are functions on a digital signal processing element DSP and the blocks from 3-24 to 3-34 are functions on a field programmable gate array element FPGA.

The required user specific burst/beam processing 3-16 and uplink processing 3-50 is performed after the subchannelization block (see FIG. 3). In it UL MAP information 2-14, 3-51 can be used for uplink user specific pilot power measurements 3-52. The user burst information 3-54 can be turned into beam mapping information 3-55. The burst/beam processing block can also be integrated in the existing subchannelization block. It requires as input the user burst/beam mapping info from the uplink processing and outputs the UL-MAP info to uplink processing. As disclosed in FIG. 3, MAC PHY IF (Media Access Control Physical layer Intermediate Frequency) signal is inputted to the loop 3-40 and to the block segmentation 3-2. The signal proceeds to randomizer 3-4, which randomises the subcarriers in frequency domain, to FEC encoder 3-6, which codes forward error correction, and to the puncturer 3-8, for adjusting the data rate. After the puncturer the signal is fed to an interleaver 3-10 for interleaving or distributing symbols from one block over a number of adjacent blocks, and to symbol constellation 3-12 for appropriate symbol modulation. The subchannelization block 3-14 can comprise many functions like pilot insertion and repetition on QPSK (Quadrature Phase-Shift Keying). The purpose for these functions is to form a basic predefined block of pilot and data subcarriers. From the subchannelization block the signal enters to burst/beam processing 3-16. The last three blocks for functions on DSP are the inverse fourier transform IFFT 3-18, CP (Cyclic Prefix) extension 3-20 and scaling factor 3-22.

The functions for FPGA start with low pass filtering 3-24. This passes the frequencies below a certain cut-off frequency and stops frequencies above said frequency. The filter(s) can be implemented with many different ways, like an analog or a digital filter, like an active or passive filter. One possibility is to use a transconductance-capacitor filter, a gm-C filter or a polyphase filter. After the low-pass filtering or alternatively a bandpass filtering, the signal enters to an interpolation filter 3-26 for changing the output sample rate. The signal is then reducted in PAPR (Peak-to-Average-Power-Ratio) reduction 3-28, this being an optional feature of the chain. The filtering continues with TX HW filter and compensation function 3-30. After the correct frequency band has been defined and applied to the signal, the transmitter TX I/Q correction 3-32 corrects the balance between the I and Q branches. The signal can also be pre-distorted in block 3-34 and converted into an analog signal in a digital-to-analog converter 3-36.

FIG. 3 represents a possible BCM (Baseband Control Module) block structure. The BCM base band processing can comprise all the functions of FIG. 3. If the beam forming RRH is applied, the BCM FPGA can be omitted and these functions can be included to the remote radio head. Moreover, e.g. IFFT, CP Extension and Scaling functions can be implemented in the RRH unit. The interface between the BCM unit and the RRH unit can be just before the IFFT function. In principle, it is also possible to apply the current BCM output signal as such at the RRH, but in that case the UL map information should be trans-ferred to RRH. This info could be extracted by applying FFT to the OFDMA symbol that carries the UL-MAP info, for example.

Figure 4:
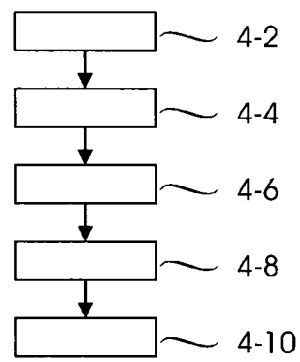
FIG. 4 is a signalling diagram of the invention and its embodiments.

FIG. 4 shows a signalling diagram of the invention and its embodiments. It shows one possible signalling flow graph of the proposed beam-forming scheme.

In step 4-2 a burst processing block of RRH extracts the UL-MAP information or some other triggering or useful information like user allocation information, which information can be obtained directly from the base station for the desired user equipment. Each user equipment is handled or allocated separately in one embodiment. After that in step 4-4 the burst processing block of RRH signals the UL pilot subcarrier positions of the desired user equipment and/or some other information, like the information on the location of UL burst of the user equipment on time/frequency axis to a burst/beam control block of RRH. In step 4-6 the burst/beam control block of RRH measures the power comprising the power of pilot signal(s) and data signal(s) and/or pilot power of the desired user equipment for all the beams. The best one or two beams of the desired user equipment are informed to the burst processing block of RRH in step 4-8. Then the burst processing block of RRH applies in step 4-10 the best beam or the best two beams of the desired user equipment in next downlink subframe transmission to the said user equipment.

Figure 5:
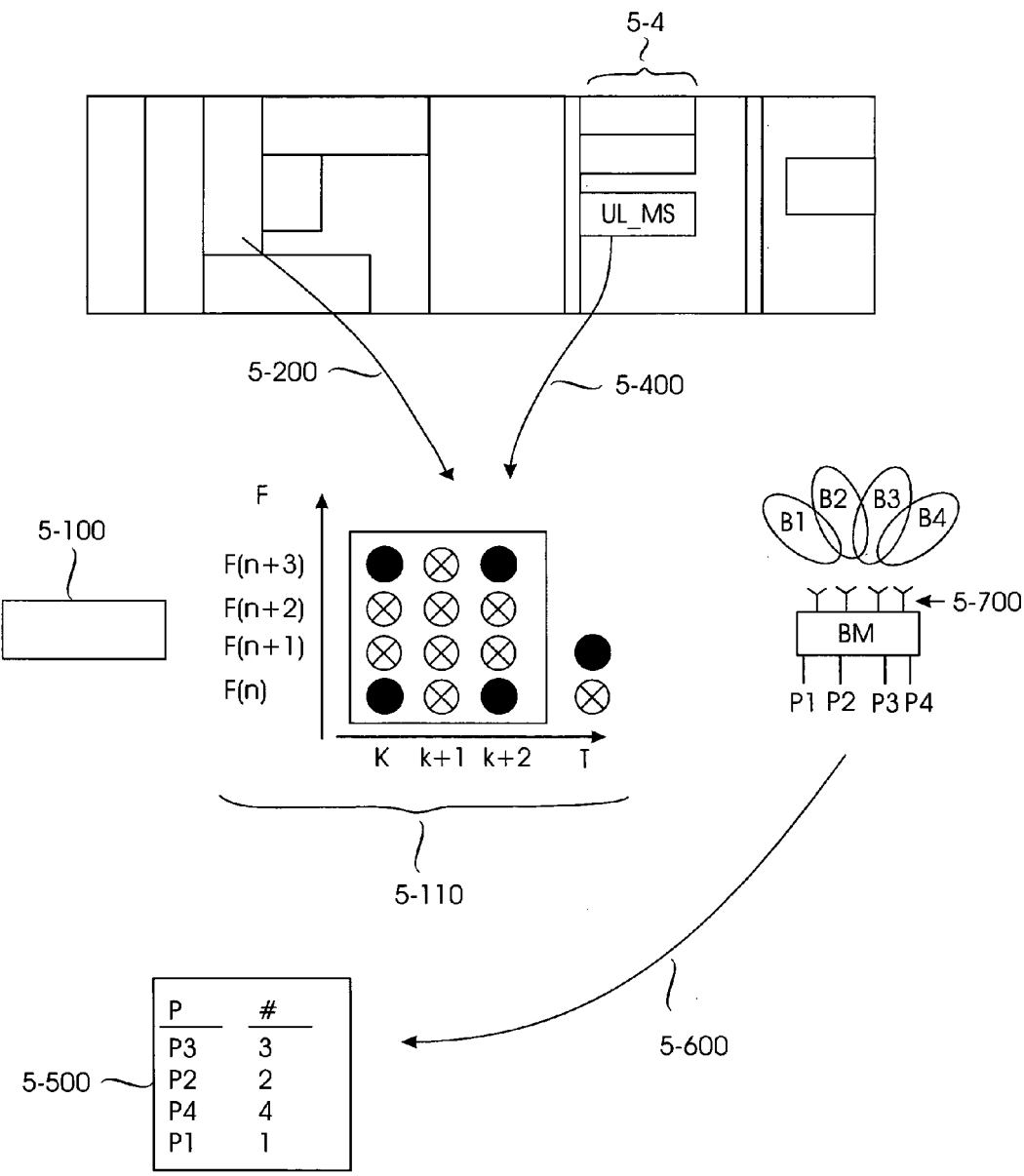
FIG. 5 is a burst/beam mapping table structure of the invention and its embodiments.

FIG. 5 illustrates a burst/beam mapping table structure of the invention and its embodiments. It shows a burst/beam mapping of the proposed beamforming scheme using WiMAX communication as an example. It has the same frame structure as shown in FIG. 2. The uplink subframe 5-4, 2-4 (in FIG. 2) comprises an uplink burst UL_MS of the desired MS or user equipment UE. FIG. 5 also shows an uplink data/pilot channel allocation unit (tile) 5-100 and a representation 5-110 of time/OFDMA symbol as an x-axis and frequency/subcarrier as a y-axis. In the representation black dots on the corners represent pilot subcarriers and other eight dots represent data subcarriers. The parameters k, k+1 and k+2 represent consecutive OFDMA symbol indeces or indexes and the functions f(n), f(n+1), f(n+2), f(n+3) represent continuous frequency bins (subcarriers) of the UL tile.

UL-MAP information reveals the pilot subcarrier positions of the desired MS (step 5-200). The pilot powers of the uplink subframe of the desired MS are measured for all the beams B1 to B4 (step 5-400) from the input ports of beamforming phase shift network (BM), and beam mapping table 5-500 is created (step 5-600), which shows the best beams for the desired MS. The table shows different pilot powers $P_3$, $P_2$, $P_4$, and $P_1$ and their respective beam numbers 3, 2, 4, and 1.

A burst/beam mapping table can be obtained in different ways. One possibility is to measure the pilot powers in user specific uplink bursts. This applies both to PUSC and AMC (Adaptive Modulation and Coding) permutation. In PUSC the pilots of a single user cover basically the entire frequency band and the actual pilot grid can be defined e.g. by the UL_PermBase signal (UL_ID_Cell signal). In the UL MAP signal, the base station may transmit ZO-NE_IE( ) signal to indicate that the subsequent allocations shall use the PUSC permutation with the specified UL_PermBase. Thus this information of PUSC frame format can be applied to define the burst (subcarrier) allocation of each user in the uplink (see FIG. 2). Thus it is possible for the RRH to measure the beam specific pilot power of each user. After measuring the uplink pilot powers in different beams in the end of a frame, the BS can then transmit user specific burst in the best beam mode, like in SISO mode (single in-single out) or in SIMO mode (single in-multiple out) or in at least two best beams mode, like in MIMO mode (multiple in-multiple out). Two or more beams are applied only, if the UL pilot measurement shows that the radio channel has adequate angular spread for supporting MIMO transmission.

Initial beam selection can be obtained from the initial ranging signal of a terminal. Moreover, it is possible to employ the periodic ranging feature of the WiMAX system for beam specific pilot power measurements.

The idea of the invention is to connect a normal, a common two antenna base station in an inventive manner to multiple antenna (e.g. 4 to 8 antennas) remote radio head. The idea can also be described to apply an analog multi-beam remote radio head with an ordinary 1 to 2 antenna BS in a special manner, which takes the advantage of the OFDMA signal properties, e.g. the frame structure and the benefits of the cyclic delay diversity. The proposed method employs the beam forming gain of an antenna array typically, but not limited to with 3 to 8 antennas. Thus, the ordinary 2-antenna BS can be connected for example to a 4-antenna RRH, which offers 4-fold power gain versus a single antenna. The proposed scheme can be implemented in many different ways, also so that there is no need to change the signal processing algorithms at the base band. Moreover, the proposed multi-beam radio head can be implemented in an optimized manner with respect to the BCM unit.

A concept and method is thus proposed, which upgrades an ordinary base station BS with two antenna ports to a multi-antenna beam forming BF base station. For example, the antenna remote radio head RRH 4 to 8 can be connected to a 2-port BS. The proposed method improves the coverage of the BS. Alternatively, the improvement in the radio link performance can be utilized directly in reducing the transmission power. Thus the improvement can be realized in a lower power consumption of the base station BS and the mobile terminal MT. The TX power can be reduced up to 50-70% compared to a single-antenna transmitter for a given coverage range. In contrast to prior art solutions, the proposed approach enables also a system level multiuser throughput increase via e.g. SDMA (Spatial Division Multiple Access) system. The method allows a very simple and robust analog solution and also advanced digital solutions.

According to the invention and its embodiments, despite the large path loss at high carrier frequencies, it is now easier and more economic to obtain large cell ranges and adequate coverage with e.g. 802.16e standard systems without large TX powers and large high-gain antennas. Now a standard 2-antenna base station can take advantage of the 4 to 8 antenna RRH, and a simple base station or terminal with limited signal processing requirements can be designed, which is power-efficient but still has good coverage and link budget. The invention and its embodiments also provide a solution to another problem: how to apply beam forming in indoor or micro cell environment, in which signals are arriving to the antenna array from different directions. In other words, the angular spreading is large in the radio channels.

According to the invention and its embodiments, fixed beam base stations do not have to be used, and no beam-specific signal processing in base band is required although they/it can also be used. Thus e.g. the usage of an 8-beam antenna array with 8 cables and 8 RF chains between the antenna unit and the base station can be avoided.

The beam forming BF is beneficial from power efficiency and system performance point of view. In above example with 4 beams, if a fixed cell range is desired and a single antenna transmission is the reference case, the total TX power can be reduced almost by a factor of four. Thus, instead of a single 4 W power amplifier PA only four ¼ W PAs is needed. If it is chosen to employ four ½ W PAs instead of one 4 W PA, still 50% decrease in total TX power is obtained and at the same time 2-fold TX power density or gain in beam directions is obtained.

High beam forming gain can be achieved with a standard base station with only e.g. two antenna connectors. The cell coverage area can be increased or alternatively the required TX power levels can be reduced. The solution improves the power efficiency of both the base station and the terminal significantly especially if the large beam forming gains are not employed only for the link budget improvement. The shown method, system and apparatus apply both to PUSC and AMC permutations e.g. in WiMAX environment.

The invention and its embodiments comprise also many more advantages. The method of the invention can by applied to e.g. PUSC/FUSC and AMC permutation in WiMAX, in 3GPP LTE, and it other communications systems and standards. The BF gain is now fully utilised. The invention and its embodiments also support high mobility when compared to a standard closed-loop MIMO+BF schemes in WiMAX specifications, which apply to the velocities up to 20-30 km/h. Velocities of 120 km/h or even higher can now be used.

In addition, it is simple to update for a basic 2-antenna BS, and the physical antenna size is significantly reduced versus separate high-gain antennas, e.g. in a 3-sector BS. As described above, the number of beams is not dependent on the number of antennas or the number of antenna ports at the baseband unit. The 2-ant BCM module can be connected to the 4 to 8 antenna array with high gain beams. Despite all the advantages, the baseband complexity increase is minimal. Also external vendors can utilize the proprietary BCM as base for their BF/MIMO products.

The proposed RRH can be used as an add-on unit for any 2 antenna base station, and simple and robust power-based algorithms can be applied, and simple spatial mode change in MIMO BF Diversity. Also BF can be combined to MIMO (Matrix B) and diversity (Matrix A)

There exist also some disadvantages with the invention and its embodiments. The invention and its embodiments requires some extra digital processing, UL-MAP info retrieval, UL user specific pilot measurements and DL burst mapping for different beams in RRH. The complexity of the radio head is further increased, if advanced digital solution applied.

The idea of upgrading a standard 2-antenna port base station with a smart antenna unit is unique, since now it is not needed to operate at the RF signal but at the baseband level for bringing the full advantage of the beam forming gain to system level throughput gain. It is now shown in detail how the WiMAX signal format can be applied for upgrading a standard base station to an efficient BF/MIMO/diversity unit. Since different users are allocated to different beams, multiuser system level gains can also be obtained e.g. in a form of SDMA. Similar approach could be applied also for fully digital and/or adaptible beam forming approach.

It will be obvious to a person skilled in the art that, as the technology advances, the inventive concept can be implemented in various ways. The invention and its embodiments are not limited to the examples described above but may vary within the scope of the claims.

What is claimed is:

1. A method comprising:
   retrieving an uplink allocation of a user equipment from a downlink control signal;
   receiving from a user equipment an uplink signal using multiple narrow antenna beams;
   measuring beam-specific pilot signal powers from the user equipment uplink signal for all the beams;
   using the measured pilot signal powers to determine, in a remote radio unit, which one or ones of the downlink narrow beams is to be used for a downlink signal for the user equipment;
   transmitting and receiving a baseband signal via a first set of antenna ports; and
   transmitting and receiving a radio frequency signal via a second set of antenna ports comprising more ports than the first set of ports.

2. A method according to claim 1, further comprising realizing a beamforming function as an analogue beamforming unit in the remote radio unit.

3. A method according to claim 1, further comprising realizing a downlink beam selection functionality in the remote radio unit.

4. A method according to claim 1, further comprising allocating different downlink bursts to different antenna beams.

5. A method according to claim 1, further comprising transmitting a preamble signal and a MAP information signal in the downlink transmission via all antenna beams using cyclic delay diversity method.

6. A method according to claim 1, further comprising measuring the pilot signal power from the uplink transmission in response to uplink MAP information transmitted in the downlink transmission.

7. A method according to claim 1, further comprising selecting one or two antenna beams with the largest uplink pilot signal power for the downlink transmission for each user equipment.

8. A multi-antenna beam forming base station, configured to:
   retrieve an uplink allocation of a user equipment from a downlink control signal;

receive from a user equipment an uplink signal using multiple narrow antenna beams;
measure beam-specific pilot signal powers from the user uplink signal for all the beams;
use the measured pilot signal powers to determine, in a remote radio unit, which one or ones of the downlink narrow beams is to be used for a downlink signal for the user equipment;
transmit and receive a baseband signal via a first set of antenna ports; and
transmit and receive a radio frequency signal via a second set of antenna ports comprising more ports than the first set of ports.

9. A communications system comprising:
at least one user equipment for enabling a user to access different network services;
a remote radio head unit configured for:
retrieving an uplink allocation of a user equipment from a downlink control signal;
receiving an uplink control information from the base station base band unit;
receiving from the user equipment an uplink signal using multiple narrow antenna beams;
measuring beam-specific pilot signal powers from the user uplink signal for all the beams;
using the measured pilot signal powers to determine, in a remote radio unit, which one or ones of the downlink narrow beams is to be used for a downlink signal for the user equipment;
transmitting and receiving a baseband signal via a first set of antenna ports; and
transmitting and receiving a radio frequency signal via a second set of antenna ports comprising more ports than the first set of ports; and
a base station unit for managing radio transmission to the user equipment and radio reception from the user equipment.

10. A non-transitory computer-readable medium comprising instructions that, when executed by a processing device, cause the processing device to perform operations comprising:
retrieving an uplink allocation of a user equipment from a downlink control signal;
receiving from a user equipment an uplink signal using multiple narrow antenna beams;
measuring beam-specific pilot signal powers from the user equipment uplink signal for all the beams;
using the measured pilot signal powers to determine, in a remote radio unit, which one or ones of the downlink narrow beams is to be used for a downlink signal for the user equipment;
transmitting and receiving a baseband signal via a first set of ports; and
transmitting and receiving a radio frequency signal via a second set of ports containing more ports than the first set of ports.

11. A non-transitory computer-readable medium according to claim 10, wherein the computer-readable medium comprises instructions that, when executed by the processing device, further cause the processing device to perform operations comprising realizing a beamforming function as an analogue beamforming unit in the remote radio unit.

12. A non-transitory computer-readable medium according to claim 10, wherein the computer-readable medium comprises instructions that, when executed by the processing device, further cause the processing device to perform operations comprising realizing a downlink beam selection functionality in the remote radio unit.

13. A non-transitory computer-readable medium according to claim 10, wherein the computer-readable medium comprises instructions that, when executed by the processing device, further cause the processing device to perform operations comprising allocating a different downlink bursts to different antenna beams.

14. A non-transitory computer-readable medium according to claim 10, wherein the computer-readable medium comprises instructions that, when executed by the processing device, further cause the processing device to perform operations comprising transmitting a preamble signal and a MAP information signal in the downlink transmission via all antenna beams using cyclic delay diversity method.

15. A non-transitory computer-readable medium according to claim 10, wherein the computer-readable medium comprises instructions that, when executed by the processing device, further cause the processing device to perform operations comprising measuring the pilot signal power from the uplink transmission in response to uplink MAP information transmitted in the downlink transmission.

16. A non-transitory computer-readable medium according to claim 10, wherein the computer-readable medium comprises instructions that, when executed by the processing device, further cause the processing device to perform operations comprising selecting one or two antenna beams with the largest uplink pilot signal power for the downlink transmission for each user equipment.

* * * * *